United States Patent Office 3,319,377
Patented May 16, 1967

3,319,377
COMPOSITION AND METHOD FOR THE
TREATMENT OF SOIL
John C. Tapas, Glenview, and John M. Menke, Morton
Grove, Ill., assignors to Velsicol Chemical Corporation,
Chicago, Ill., a corporation of Illinois
No Drawing. Filed Aug. 27, 1964, Ser. No. 392,587
21 Claims. (Cl. 47—9)

This application is a continuation-in-part of our copending application, S.N. 266,171, filed Mar. 19, 1963, now abandoned, which in turn is a continuation-in-part of our application, S.N. 188,233, filed Apr. 17, 1962, copending therewith and now abandoned.

This invention relates to a composition and method for the treatment of soil to reduce soil erosion. More particularly this invention relates to the reduction of soil erosion which comprises applying to the surface of the soil a liquid composition of a thermoplastic petroleum-derived, hydrocarbon resin; a linear vinyl polymer; and a diluent therefor.

In the reduction and prevention of soil erosion it is usually desirable that plants and grasses grow and become firmly established in areas subject to erosion, not only to prevent erosion, but also to improve soil fertility and soil structure, and for the aesthetic value of the grass and plants. While under ideal conditions seeds of plants and grasses germinate and grow naturally in the absence of artificial protection, i.e., soil treatment, the conditions which cause erosion, such as high winds and excessive rainfall, often cause seeds and soil to be washed or blown away and young plants to be uprooted. These effects are particularly noticeable on sloping terrains, such as on hills, mountains, river embankments, road shoulders and embankments, and the like.

Various attempts have been made to protect the soil from erosion. Some of these attempts comprised covering the soil with permanent impervious continuous coatings, such as cement, asphalt and allied substances, and the like. While these coatings prevent wind and water from reaching the soil, they also prevent the germination of plant and grass seeds and their growth through the coating. Other attempts to control erosion, such as coating the soil with rubber latex, resinous materials, straw, paper, pulp, mulches, and the like have also generally failed, either due to the dissipation of the coatings or coverings before the seeds could germinate and mature, as in the case of most rubber latex and resinous coatings; or because they were unsightly, as in the case of the other stated materials. Further attempts in the case of rubber latex and resinous materials, to slow the dissipation of the coatings by increasing the thickness of the coating, merely served to prevent germination and/or retard or prevent the growth of grasses and plants through the coating. Often the growing plants could not penetrate the coatings.

Thus, despite the attempts heretofore made to control soil erosion, there is still a need for a method of controlling and preventing soil erosion, which also protects seeds from being washed or blown away during germination and permits young plants and grasses to grow unhindered through the soil surface.

Therefore, it is one object of the present invention to provide a method for the effective control of erosion of soil.

It is another object of the present invention to provide a method for the protection of soil and of seeds planted therein from erosion caused by wind and rain.

Still another object of this invention is to provide a method for the control of erosion of soil and to assist the germination of grass and plant seeds.

Another object is to provide a method for the control of erosion of soil comprising chemical pest control agents and to protect the growth of desirable plants from injury by insects, fungi, weeds, and the like.

Another object is to provide a novel composition useful in the foregoing methods.

These and other objects of the present invention will be apparent from the ensuing description.

The foregoing objects can be accomplished by the method of the present invention which comprises applying to the soil surface a liquid composition comprising a thermoplastic, petroleum-derived, hydrocarbon resin; a linear vinyl polymer; and a diluent therefor. It is preferred that the liquid composition described above be a water dispersible or water dilutible composition, wherein the resin and polymer are present as aqueous emulsions, and the diluent is water.

It is unexpected and highly novel that the use of the liquid composition disclosed herein should accomplish the objects set forth above, when use of aqueous emulsions of either the thermoplastic, petroleum-derived, hydrocarbon resin or the linear vinyl polymer alone do not accomplish these objects. Hence, it is the use of the combination of the ingredients in the liquid composition disclosed herein which affords the desirable results of this invention, which cannot be obtained or predicted from the use of the component ingredients themselves. Like materials heretofore utilized in attempts to control soil erosion, the application of the individual ingredients separately either does not effectively prevent soil erosion due to rapid dissipation of the coating or prevents erosion only when applied in a concentration which also prevents seed germination and the passage of air and water through the coating.

In carrying out the method of the present invention, it is preferred to utilize a thermoplastic petroleum-derived hydrocarbon resin having a softening point of from about 50° to about 200° F. (ball and ring method) as the resin ingredient in the above-described liquid composition. It is more preferred to use a thermoplastic petroleum-derived hydrocarbon resin having a softening point of from about 50° to about 200° F., a mixed aniline point of from 20° to about 80° C., and an iodine number of from about 70 to about 300, as the resin ingredient. The resin utilized in the process of the present invention can be produced by thermal or catalytic polymerization of unsaturated petroleum hydrocarbon fractions by methods and procedures common to the art.

It is even more preferred to use as the resin ingredient in the liquid composition utilized in the method of the present invention, a thermoplastic petroleum-derived hydrocarbon resin having a softening point of from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from about 1 to about 12, and a molecular weight of from about 300 to about 1400 as measured by cryoscopic means.

An especially preferred resin ingredient of the composition used in the method of the present invention, hereinafter designated "Resin A," is a thermoplastic petroleum-derived, substantially completely polymerized, aromatic, hydrocarbon resin having a softening point of from about 100° to about 200° F., a mixed aniline point of from about 20° to about 60° C., an iodine number of from about 70 to about 220, a saponification number of from 0 to about 2, a flash point (Cleveland Open Cup) above 425° F., an A.P.I. gravity at 60° F., of from 0 to about 10 degrees, a Gardner color (50% toluene) of from about 1 to about 12, and a molecular weight of from about 600 to about 1400 as measured by cryoscopic means.

A second especially preferred resin ingredient, hereinafter designated "Resin B," is a thermoplastic, petroleum-derived hydrocarbon resin composed substantially of tetramers, pentamers, hexamers, heptamers, octamers, and higher polymers of conjugated aliphatic and cyclic dienes having less than 7 carbon atoms per diene monomer, and having a softening point of from about 50° to about 100° F., a mixed aniline point of from about 40° to about 80° C., an iodine number of from about 200 to about 300, a saponification number of from 0 to about 2, a flash point (Cleveland Open Cup) above 350° F., an A.P.I. gravity at 60° F., of from 0 to about 20 degrees, a Gardner color (50% toluene) of from about 1 to about 12, and a molecular weight of from about 300 to about 600 as measured by cryoscopic means. Examples of conjugated aliphatic dienes suitable for use in preparing Resin B are: isoprene, cis-piperylene, trans-piperylene, 1,3-hexadiene, and 2,4-hexadiene; while examples of suitable conjugated cyclic dienes are: cyclopentadiene, methylcyclopentadiene, and 1,3-cyclohexadiene.

A particularly preferred Resin B is the tetramer and higher polymer fraction which has an A.P.I. gravity of from about 5 to about 20 degrees, and which is produced from a liquid petroleum hydrocarbon stream composed substantially of dimers, trimers, codimers, and higher polymers of conjugated aliphatic and cyclic dienes having less than 6 carbon atoms per diene monomer molecule. The said liquid petroleum hydrocarbon stream can be fractionally distilled, preferably in vacuo, to recover the tetramer and higher polymer fraction (Resin B) as the residue.

The linear vinyl polymer ingredient of the liquid composition utilized in the method of this invention is selected from the group consisting of homopolymers and copolymers of vinyl alcohol, vinyl acetal, vinyl chloride, vinyl acetate, acrylates and methacrylates, their copolymers with vinyl esters of long chain fatty acids, their copolymers with di(alkyl esters) of $\alpha, \beta$-ethylenically unsaturated dicarboxylic acids, preferably wherein the alkyl ester group contains from 4 to 18 carbon atoms, and mixtures thereof. Exemplary of the vinyl esters of long chain fatty acids suitable for copolymerization with the monomers described above to form linear vinyl polymer ingredients are: vinyl myristate, vinyl palmitate, vinyl stearate, vinyl laurate, and the like. Exemplary of the suitable di(alkyl esters) of $\alpha, \beta$-ethylenically unsaturated dicarboxylic acids which can be copolymerized with the vinyl monomers described above to form the linear vinyl polymer ingredient are: dibutyl maleate, dioctyl mateate, dibutyl fumarate, and the like. These polymers, their plasticized products and inherently plasticized copolymers are commercially available or can be readily prepared by methods common to the art.

The resin and polymer ingredients are combined with a liquid diluent to form the liquid composition utilized in the method of the present invention. The diluent must be inert, that is, unreactive with the resin and polymer ingredients and harmless to growing plants and grasses. Organic inert solvents can be used if desired, although the preferred diluent is water. Since the resin and polymer ingredients heretofore described are insoluble, they must be emulsified to form an emulsion with the water.

Emulsions of the linear vinyl polymer ingredient are commercially available or can be prepared by methods common to the art, such as by emulsion polymerization with emulsifiers, such as sodium stearate and the like. It is preferred to utilize a polyvinyl acetate homopolymer or a vinyl acetate-vinyl ester of a long chain fatty acid copolymer emulsion as the polymer ingredient. An example of a suitable vinyl acetate copolymer emulsion is the emulsion of a vinyl acetate-vinyl stearate copolymer, which is commercially available, or alternatively can be prepared by methods common to the art, such as by emulsion polymerization.

It is even more preferred to utilize as the linear vinyl polymer ingredient an emulsion of a copolymer of vinyl acetate and a di(alkyl ester) of an $a, \beta$-ethylenically unsaturated dicarboxylic acid. A typical emulsion as described above is an aqueous emulsion containing 55% solids consisting primarily of a copolymer of vinyl acetate and dibutyl maleate. Such an emulsion is commercially available as "Flexbond 800" marketed by the Air Reduction Company, New York, New York, U.S.A.

The resin ingredient is also preferably utilized in the form of an emulsion. A typical resin-in-water emulsion composition useful in the method of this invention can be readily prepared by heating the resin until almost molten, adding emulsifiers, and, if desired, wetting agents, and mixing with water until an emulsion is formed. At first a water-in-resin emulsion is formed, which can be slowly mixed through an inversion period to yield a concentrated resin-in-water emulsion. This emulsion can be further diluted to any desired concentration. The temperature at which the emulsion is prepared is dependent upon the softening point of the resin and will usually correspond thereto.

The emulsifiers and wetting agents useful with the resin described herein to prepare the compositions utilized in the method of the present invention are surface-active materials of the anionic or nonionic types. Preferably a combination of the two types is used to obtain rapid emulsions of excellent stability. Typical examples of such surface-active materials are sodium stearate, morpholine oleate, sodium lauryl sulfate, sodium 2-ethylhexyl sulfate, sodium 2-ethylhexanol-1-sulfate, sodium 7-ethyl-2-methylundecanol-4-sulfate, sodium naphthalenesulfonate, sodium alkylnaphthalenesulfonate, sodium oleic acid sulfonate, sodium castor oil sulfonate, glycerol monostearate containing a soap (or a sodium fatty alcohol sulfate), polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, di- and higher polyhydric alcohol fatty acid esters, cholesterol and other fatty acid esters, lanolin, oxidized fatty oils, alkylated aryl polyether alcohols such as the condensation product of diamylphenol with ethylene oxide, and the like. Mixtures of such materials can also be used to combine or modify properties.

Emulsions of the resin ingredient and the polymer ingredient can readily be combined for example, by stirring together in a suitable vessel, such as a mixing tank, to form a concentrated mixture. This liquid concentrate can be diluted with water to any desirable concentration to form the liquid composition utilized in the process of this invention. It is preferred to utilize from about 20% to about 85%, by weight of the mixture, of the resin-in-water emulsion with from about 15% to about 80%, by weight of the mixture, of the polymer-in-water emulsion in preparing the mixture. Emulsions of the resin and polymer ingredients containing a minimum amount of water are preferred for economy, although more dilute emulsions can be utilized with equal success. For example, emulsions containing from about 40% to about 60% solids by weight have been found to be convenient in forming the mixture described above.

The preparation of the liquid compositions utilized by the method of the present invention will be more clearly understood from the following examples:

EXAMPLE I

*Preparation of an emulsion of Resin A*

Resin A (578.5 gm.), which was a thermoplastic, petroleum derived, substantially completely polymerized, aromatic, hydrocarbon resin having a softening point of 140°–150° F., a mixed aniline point of 32°–36° C., an iodine number of 145–155, a saponification number of 0–2, a flash point (Cleveland Open Cup) above 425° F., an A.P.I. gravity at 60° F. of 0–4.5 degrees, a Gardner color (50% toluene) of 5–10, and a molecular weight of about 1000 as measured by cryoscopic means: was heated at about 190° F. until the resin was almost molten. A nonionic surfactant of the octyl phenoxy polyoxyethylene ethanol type (5.8 gm.), soya fatty acid (52.0 gm.), and 2-amino-2-methylpropanol (15.8 gm.) were mixed into the almost molten resin until a uniform mixture was formed. Water (695 gm.) was slowly added at the temperature of the mixture with agitation by means of a paddle stirrer driven at a maximum speed of 875 revolutions per minute. At first a water-in-resin emulsion was formed, but on continued stirring with continuous addition of water the emulsion inverted to a resin-in-water emulsion as indicated by the change from a doughy consistency to a uniform milky consistency. After all of the water had been added the emulsion concentrate thus formed had a viscosity of 54 Krebs units, a solids content of 51.0 by weight, a pH of 8.8, and a density of 8.45 pounds per gallon.

EXAMPLE 2

*Preparation of Resin B*

A hydrocarbon-bottoms stream composed substantially of dimers, trimers, codimers, cotrimers and higher polymers of conjugated aliphatic and cyclic dienes, and having the following physical properties: A.P.I. gravity at 60° F., 26 degrees; Gardner color, 3; viscosity (S.S.U. at 100° F.), 43 sec.; flash point (Cleveland Open Cup), 135–138° F.; iodine number, 326; and aniline point, 34.2° C.; was heated at 590–595° F. for 4 hours. Dimers, trimers, codimers, and cotrimers were distilled off by heating to a pot temperature of 575° F. at 10 mm. mercury pressure, to yield Resin B as the residue, having a softening point of 74° F., a mixed aniline point of 69.4° C., an iodine number of 276, a saponification number of 0–2, a flash point (Cleveland Open Cup) of 375° F., a Gardner color (50% toluene) of 6–7, and a molecular weight of 200–600 as determined by cryoscopic means.

EXAMPLE 3

*Preparation of an emulsion of Resin B*

Resin B (578.5 gm.) prepared as in Example 2, was heated to 120°–140° F. A nonionic surfactant, nonyl phenoxy polyoxyethylene ethanol (43.1 gm.), and the sodium salt of an alkyl aryl polyether sulfonate (14.7 gm.) were mixed into the almost molten resin until a uniform mixture was obtained. Water (500 gm.) was slowly added at 120–140° F. with agitation provided by a paddle stirrer driven at a maximum speed of 875 revolutions per minute. A water-in-resin emulsion was first formed which inverted to resin-in-water emulsion as indicated by the change from doughy to milky consistency. After all of the water had been added the emulsion thus formed had a viscosity of 47 Kreb units, a solids content of 53.6% by weight, and a pH of 7.6.

EXAMPLE 4

*Preparation of a concentrated mixture of emulsions*

Emulsion product of Example 3 (200 gms.) and 200 grams of a commercially obtained vinyl acetate-dibutyl maleate copolymer emulsion "Flexbond 800," marketed by Air Reduction Company, New York, N.Y., having a viscosity of 550–850 centipoises, a solids content of 51–53%, a pH of 5.0–6.0, a particle size of about 0.7 microns, and a density of about 9 pounds per gallon; were placed into a one pint metal can and stirred with a spatula until uniformly blended. Thus 400 grams of a concentrated mixture of the emulsions of Resin B and vinyl acetate copolymer were obtained.

In the manner described in Example 4, other concentrated mixtures of emulsions can be prepared. In illustration of the preparation of these other mixtures, the following examples are presented wherein the materials specified can be blended according to the procedure of Example 4 to yield the corresponding mixture:

| Ex. No. | Emulsion of Resin A, Product of Example 1, wt., gms. | Emulsion of Resin B, Product of Example 3, wt., gms. | Polymer Emulsion Type | Wt., gms. |
|---|---|---|---|---|
| 5 | 200 | | Vinyl acetate-dibutyl maleate copolymer ("Flexbond 800"). | 200 |
| 6 | | 300 | do | 100 |
| 7 | 100 | | do | 300 |
| 8 | 300 | | do | 100 |
| 9 | | 100 | do | 300 |
| 10 | | 200 | Polyvinyl chloride | 200 |
| 11 | 200 | | Polyvinyl alcohol | 200 |
| 12 | | 300 | Ethyl acrylate-methyl methacrylate copolymer. | 100 |
| 13 | 200 | | Vinyl chloride-vinyl acetate copolymer. | 220 |

The concentrated mixtures heretofore described can also be readily pigmented to impart color into the liquid composition utilized in this invention. Pigments can be added, for example, by preparing a dispersion of the pigments in water and blending the dispersion with the resin and polymer emulsions according to the method of Example 4. The application of the pigmented liquid compositions according to the method of the present invention, provides a colored coating on the surface of the soil which has a desirable aesthetic value and also serves as an indicator of the presence of the coating.

Concentrated mixtures of the emulsions, as heretofore described, are preferably diluted with water to form the liquid compositions used in the method of this invention. While relatively concentrated compositions can be used to obtain thick coatings of the resin and polymer mixture on the soil, it is preferred to utilize aqueous compositions comprising from about 5% to about 20% by volume of concentrated mixture of emulsions to obtain the desired soil penetration and binding effects.

The liquid compositions utilized in the method of the present invention can be sprayed onto the surface of the soil by methods and procedures common to the art, such as by hand sprayers, commercial field sprayers, and the like. The compositions penetrate the soil to a depth depending on the porosity of the soil, the dilution of the composition, and the rate of application. It is preferred to apply the liquid composition in a soil stabilizing amount, i.e., in an amount adequate to bind the soil particles in the upper layers of the soil and form a thin film of material on the surface. It has been found adequate to apply the liquid composition at a rate of at least about 700 gallons per acre of soil surface, and preferably between about 800 and 2,000 gallons per acre to obtain maximum penetration and binding properties.

The method of this invention provides the binding of the top layers of soil and a continuous coating on the surface of the soil, which prevent the erosion of top soil by wind and water. The binding of the soil and coating are usually effective for a period of approximately 6 weeks which is generally sufficient for the germination and established growth of most grasses and plant seeds. The treatment also assists the germination of plant and grass seeds, and offers little or no resistance to the passage of air and water through the coating and to grass or seedlings pushing through the treated soil and coating. The treated soil further protects the root structure of young grass and plant seedlings from being damaged or uprooted by wind or water.

The liquid compositions utilized in the method of this invention can also comprise such additional substances as pesticides, such as herbicides, insecticides, miticides, aphicides and fungicides; fertilizers, activators, stimulants, and the like. Throughout this specification the term "pesticide" will be used synonymously with the term "pesticidal chemical compound." The use of one or more of these additional substances will provide the desirable benefits of the method of this invention plus the benefits of the added substances.

For example, the incorporation of herbicidal chemical compounds into the liquid compositions utilized in the method of this invention will result not only in the control of soil erosion but in the control of undesirable weeds in the soil as well. A further advantage of such compositions is that their use will permit control of the depth to which the herbicide permeates into the soil. As a result, normally nonselective herbicides or soil sterilants, which kill all the plant growth in the area where they are employed, can be made comparatively selective in their action. That is, the penetration into the soil of a composition of this invention comprising a nonselective herbicide can be controlled by proper dilution and rate of application as previously discussed so that minimal penetration is obtained. The herbicide will therefore have only localized activity near the surface of the soil, where it can attack short-rooted weeds such as the grassy weeds. At the same time, its penetration into the soil will not be sufficient to affect the deep roots of many commercial crops.

A wide variety of herbicidal chemical compounds known to the art can be used in the method and compositions of this invention. These can include chlorophenoxy herbicides such as 2,4-dichlorophenoxyacetic acid,
2,4,5-trichlorophenoxyacetic acid,
2-methyl-4-chlorophenoxyacetic acid,
3,4-dichlorophenoxyacetic acid,
parachlorophenoxyacetic acid,
4-(2,4-dichlorophenoxy)butyric acid,
4-(2-methyl-4-chlorophenoxy)butyric acid,
4-(2,4,5-trichlorophenoxy)butyric acid, and
2-(2,4,5-trichlorophenoxy)propionic acid;

carbamate herbicides such as isopropyl N-phenylcarbamate,
isopropyl N-(3-chlorophenyl)carbamate, and
4-chloro-2-butynyl N-(3-chlorophenyl)carbamate;

substituted urea herbicides such as dichloral urea,
3-phenyl-1,1-dimethylurea,
3-(para-chlorophenyl)-1,1-dimethylurea,
3-(3,4-dichlorophenyl)-1,1-dimethylurea, and
1-n-butyl-3-(3,4-dichlorophenyl)-1-methylurea;

symmetrical triazine herbicides such as 2-chloro-4,6-bis(diethylamino)-s-triazine,
2-chloro-4,6-bis(ethylamino)-s-triazine,
2-chloro-4-ethylamino-6-isopropylamino-s-triazine,
2-chloro-4-ethylamino-6-diethylamino-s-triazine,
2-chloro-4-diethylamino-6-isopropylamino-s-triazine,
2-methoxy-4,6bis(ethylamino)s-triazine,
2-methoxy-4,6-bis(isopropylamino)-s-triazine, and
2-chloro-4,6-bis(diisopropylamino)-s-triazine;

chloroacetamide herbicides such as alpha-chloro-N,N-dimethylacetamide,
alpha-chloro-N,N-diethylacetamide,
alpha-chloro-N,N-di-n-propylacetamide,
alpha-chloro-N,N-diallylacetamide,
alpha-chloro-N-propylacetamide,
alpha-chloro-N-isobutylacetamide,
alpha-chloro-N-sec-butylacetamide,
alpha-chloro-N-isoamylacetamide,
4-(chloroacetyl)morpholine, and
1-(chloroacetyl)piperidine;

chlorinated aliphatic acid herbicides such as trichloroacetic acid,
2,2-dichloropropionic acid,
2,3-dichloroisobutyric acid,
2,2-trichloropropionic acid, and
2,3,3'-trichloroisobutyric acid;

thiocarbamic acid and dithiocarbamic acid herbicides such as 2-chloroallyl diethyldithiocarbamate,
sodium N-methyldithiocarbamate,
ethyl N,N-di-n-propylthiocarbamate,
n-propyl di-n-propylthiolcarbamate,
ethyl ethyl-n-butylthiolcarbamate, and
propyl ethyl-n-butylthiolcarbamate;

chlorinated benzoic acids and phenylacetic acids such as 2,3,6-trichlorobenzoic acid,
2,3,5,6-tetrachlorobenzoic acid,
2-methoxy-3,6-dichlorobenzoic acid,
2-methoxy-3,5,6-trichlorobenzoic acid,
2-methoxy-3,6-dichlorophenylacetic acid,
2-methoxy-3,5,6-trichlorophenylacetic acid,
2,3,6-trichlorophenylacetic acid,
3-methoxy-2,6-dichlorophenylacetic acid,
2-methoxy-5-chloro-6-methylphenylacetic acid, and
2-methoxy-3-nitro-5-chlorobenzoic acid;

and such herbicides as aminotriazole,
maleic hydrazide,
disodium 3,6-endoxohexahydrophthalate,
N-1-naphthylphthalamic acid,
N-1-naphthylphthalimide,
acrolein,
2,3-dichloroallyl diisopropylthiolcarbamate,
biuret, technical chlordane consisting preponderantly of the compound 1,2,4,5,6,7,8,8-octachloro-4,7-methano-3a,4,7,7a-tetrahydroindane (the remainder being related active compounds arising during the manufacturing process),
dimethyl 2,3,5,6-tetrachloro-terephthalate,
1,1-ethylene-2,2-dipyridilium dibromide,
2-(2,4,5-trichlorophenoxy)ethyl 2,2-dichloropropionate,
the beta- and gamma-isomers of 4,5,6,7,8,8-hexachloro-3a,4,7,7a-tetrahydro-4,7-methanoindene (M.P. 210–211° under nitrogen),
tris(2,4-dichlorophenoxyethyl)phosphite,
3,4-dichloropropionanilide,
3,5-dimethyltetrahydro-1,3,5,2H-thiadiazine-2-thione,
N-(3,4-dichlorophenyl)-2-methylpentanamide,
N-(3-chloro-4-methylphenyl)2-methylpentanamide,
N-(3,4-dichlorophenyl)methacrylamide, and
O-(2,4-dichlorophenyl) O-methyl isopropylphosphoramidothioate.

Such herbicides can also be used in the method and compositions of this invention in the form of their salts, esters, amides, and other derivatives whenever applicable to the particular parent compounds.

Similarly, the incorporation of insecticidal chemical compounds into the liquid compositions utilized in the method of this invention will result not only in the control of soil erosion but in the control of undesirable insect pests in the soil as well. A wide variety of insecticidal chemical compounds known to the art can be used in the method and compositions of this invention. Typical examples of such insecticidal chemical compounds are halogenated compounds such as 1,1,1-trichloro-2,2-bis(p-chlorophenyl)ethane,
1,1,1-trichloro-2,2-bis(p-methoxyphenyl)ethane,
1,1-dichloro-2,2-bis(p-chlorophenyl)ethane,
hexachlorocyclohexane, 1,2,4,5,6,7,8,8-octachloro-4,7-methano-3a,4,7,7a-tetrahydroindane,
1,2,3,4,10,10-hexachloro-1,4,4a,5,8,8a-hexahydro-1,4,5,8-dimethanonaphthalene,
1,2,3,4,10,10-hexachloro-6,7-epoxy-1,4,4a,5,6,7,8,8a-octahydro-1,4,5,8-dimethanonaphthalene,
1,4,5,6,7,8,8-heptachloro-3a,4,7,7a-tetrahydro-4,7-methanoindene,
1,2,3,4,10,10-hexachloro-6,7-epoxy-1,4,4a,5,6,7,8,8a-octahydro-1,4,5,8-endo,endo-dimethanonaphthalene,
6,7,8,9,10,10-hexachloro-1,5,5a,6,9,9a-hexahydro-6,9-methano-2,4,3-benzodioxathiepin-3-oxide, and
4,4'-dichlorobenzilate;

organic phosphorus compounds such as tetraethyl pyrophosphate,
O,O-diethyl O-p-nitrophenyl thiophosphate,
O-ethyl O-p-nitrophenyl phenylthiophosphonate,
octamethylpyrophosphoramide,
O,O-diethyl O-(2-ethylmercapto)ethylphosphorothioate,
O,O-diethyl s-(ethylmercapto)methylphosphorodithioate,
O,O-diethyl O-(4-methyl-7-coumarinyl)phosphorothioate,
O,O-diethyl O-(2-isopropyl-6-methyl-4-pyrimidinyl)phosphorothioate,
O,O-dimethyl s-(1,2-dicarbethoxyethyl)phosphorodithioate,
O,O-dimethyl s-(4-oxobenzotriazino-3-methyl)phosphorodithioate,
O,O-dimethyl O-(3-chloro-4-nitrophenyl)phosphorothioate,
O,O-dimethyl 1-hydroxy-2,2,2-trichloroethylphosphonate, and
dimethyl 2,2-dichlorovinyl phosphate;

organic nitrogen compounds such as 4,6-dinitro-o-cresol,
2,4-dinitro-6-cyclohexylphenol, and
azobenzene;

organic sulfur compounds such as phenothiazine,
phenoxathiin,
lauryl thiocyanate,
beta,beta'-dithiocyanodiethyl ether (bis(2-thiocyanoethyl)ether), and
isobornyl thiocyanoacetate;

as well as such substances, usually referred to as fumigants, as hydrogen cyanide, carbon tetrachloride, ethylene dichloride, propylene dichloride, paradichlorobenzene, and the like.

The liquid compositions utilized in the method of this invention can also comprise fungicidal chemical compounds, useful for the control of soil fungi and in some cases of soil nematodes as well. Typical examples of such fungicidal chemical compounds are ferric dimethyl dithiocarbamate, disodium ethylenebisdithiocarbamate, zinc ethylenebisdithiocarbamate, tetramethylthiuram disulfide, tetrachloro-p-benzoquinone, 2,3-dichloro-1,4-naphthoquinone, 2-n-heptadecylglyoxalidine, N-(trichloromethylthio)-1,2,3,6-tetrahydrophthalimide, 2-heptadecyl-2-imidazoline, 2,4-dichloro-6-(o-chloroanilino)triazine, and the like.

Many of the pesticidal chemical compounds known in the pesticide art are solids or are liquids insoluble in water. Such pesticides can be incorporated into the compositions of this invention by first dissolving them in a suitable inert organic solvent as previously discussed and then blending the solutions with the composition to be used for application to the soil. If desired, emulsifiers and wetting agents of the type shown herein to be useful for the resins in this invention can also be used in the pesticide solutions to enhance their ability to blend homogeneously with the resin emulsions.

The rate at which the pesticides can be used in the method and compositions of this invention will be determined largely by the specific type of pesticide employed and by the species of pests to be controlled. Generally, the instructions of the pesticide's manufacturer can be followed, and the quantity of the pesticide can be adjusted so that it is present in the composition in a pesticidally toxic amount. Many pesticides can be used at the rate of only one or two ounces per acre, while others will be used at rates of at least one pound or more per acre. Such rates of application can be obtained by adjusting the amount of pesticide added to the aqueous compositions before they are applied to the soil, and it is particularly convenient for this purpose to add the pesticide in the form of a solution in an inert organic solvent with an emulsifier or wetting agent or in the form of an aqueous emulsion prepared by extending the solution with water. In a preferred embodiment of this invention, the aqueous compositions for the treatment of soil will comprise from about 5% to about 20% by volume of a mixture of hydrocarbon resin-in-water emulsion and linear polymer-in-water emulsion and from about 50% to about 95% by volume of pesticidal chemical compound-in-water emulsion.

The effectiveness of the method of the present invention in controlling the erosion of soil can be demonstrated by greenhouse experiments using seeded soil.

In typical experiments, one square foot flats filled with untreated highly organic soil were seeded with a mixture of 65% Kentucky bluegrass, 30% redtop and 5% white clover. The flats were elevated to a 33% slope from the horizontal and the liquid compositions sprayed on duplicate flats at a rate of 1,000 gallons per acre. The flats were maintained at a temperature between 72° and 80° F. After 24 hours, the flats were subjected to spraying with an amount of water equal to a ¾-inch rainfall in 8 minutes and the flats observed for erosion. The flats were then watered in the elevated position as required. After 8 days, the germination of the seeds was observed and compared with the germination of untreated flats. The results of these experiments are presented in the table below, wherein erosion is rated on a scale of 0 to 3, as follows:

0 = no erosion
1 = slight erosion—no top soil loss evident
2 = erosion observed—loss of top soil evident
3 = serious erosion—large loss of top soil

TABLE I

| Mixture of Emulsions | Dilution [1] | Erosion |
|---|---|---|
| Product of Example 4 | 1:6 | 0 |
| Do | 1:8 | 0 |
| Do | 1:10 | 1 |
| Do | 1:15 | 1 |
| Product of Example 5 | 1:10 | 1 |
| Do | 1:20 | 1 |
| Control | | 3 |

[1] Volume of mixture to volumes of water.

Thus, it can be seen from Table I that the application of the liquid composition according to the method of the present invention prevented the serious erosion which normally occurs under the conditions of the test, as evidenced by the untreated control flats. It was further noted that the germination of the seeds in the treated flats was equal to or greater than the germination of seeds in the untreated flats. The experimental conditions used herein were severe enough to cause serious erosion in untreated flats, but mild enough to test germination independent of the erosion of the top soil.

Experiments were also carried out to illustrate the effectiveness of pesticidal chemical compounds when used in the soil stabilizing compositions of this invention. For example, greenhouse flats of unsterilized soil were seeded to a lawn mixture consisting of Kentucky bluegrass, redtop and white clover. A pigmented sample of the emulsion concentrate of Example 4 was combined with an emulsion concentrate of the dimethylamine salt of 2-methoxy-3,6-dichlorobenzoic acid containing 4 lbs. of the active material per gallon of concentrate. The combined concentrate was diluted at the rate of one part by volume stabilizer to eight parts of water; and the dilution was sprayed on the soil in the flats at the rate of 1,000 gallons/acre, which provided 0.5 lb. of the dimethylamine salt of 2-methoxy-3,6-dichlorobenzoic acid per acre. An untreated flat was maintained as a control.

At the end of 30 days, all the flats were inspected. The untreated control flat had a count of 51 weeds per sq. ft., the weeds being pig weed, mustard, lambsquarters, and fox tail. The flat treated with the herbicidal chemical compound plus soil stabilizer emulsion, however, had a weed count of only 9 weeds per sq. ft., indicating an 82% decrease in weed population. The few remaining weeds were sickly in appearance. The growth of the grasses in both the treated and untreated flats was normal and healthy.

We claim:

1. A method for the treatment of soil to reduce soil erosion which comprises applying to the soil surface a soil stabilizing amount of an aqueous composition comprising a mixture of
   (1) from about 20% to about 85%, by weight of the mixture of a thermoplastic petroleum-derived hydrocarbon resin-in-water emulsion, said resin having a softening point of from about 50° to about 200° F., a mixed aniline point of from about 20° to about 80° C., and an iodine number of from about 70 to to about 300; and
   (2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of $\alpha,\beta$-ethylenically unsaturated dicarboxylic acids wherein the alkyl ester group contains from 4 to 18 carbon atoms, and mixtures thereof.

2. A method for the treatment of soil to reduce soil erosion which comprises applying to the soil surface a soil stabilizing amount of an aqueous composition comprising a mixture of
   (1) from about 20% to about 85%, by weight of the mixture, of a thermoplastic, petroleum-derived, hydrocarbon resin-in-water emulsion, said resin having a softening point of from about 50° to about 200° F., a mixed aniline point of from about 20° to about 80° C., an iodine number of from about 70 to about 300, a saponification number of from 0 to about 2 a flash point (Cleveland Open Cup) above 350° F., an A.P.I. gravity at 60° F. of from 0 to about 20 degrees, a Gardner color (50% toluene) of from 1 to about 12, and a molecular weight of from about 300 to about 1400 as measured by cryoscopic means; and
   (2) from about 15% to about 80%, by weight of the mixture, of a linear polymer-in-water emulsion, said polymer selected from the group consisting of homopolymers of vinyl alcohol, vinyl acetal, vinyl chloride, viny acetate, acryates and methacrylates, copolymers of two or more of said monomers, copolymers of said monomers with vinyl esters of long chain fatty acids, copolymers of said monomers with di(alkyl esters) of $\alpha,\beta$-ethylenically unsaturated dicarboxylic acids wherein the alkyl ester group contains from 4 to 18 carbon atoms, and mixtures thereof.

3. A method for the treatment of soil to reduce soil erosion which comprises applying to the soil surface a soil stabilizing amount of an aqueous composition comprising from about 5% to about 20% by volume of a mixture of
   (1) from about 20% to about 85%, by weight of the mixture, of a thermoplastic, petroleum-derived hydrocarbon resin-in-water emulsion, said resin having a softening point from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from 300 to about 1400 as measured by cyroscopic means; and
   (2) from about 15% to about 80%, by weight of the mixture of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of $\alpha,\beta$-ethylenically unsaturated dicarboxylic acids wherein the alkyl ester group contains from 4 to 18 carbon atoms, and mixtures thereof.

4. A method for the treatment of soil to reduce soil erosion which comprises applying to the soil surface a soil stabilizing amount of an aqueous composition comprising from about 5% to about 20% by volume of a mixture of
   (1) from about 20% to about 85%, by weight of the mixture of a thermoplastic, petroluem-derived hydrocarbon resin-in-water emulsion, said resin having a softening point of from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from 300 to about 1400 as measured by cryoscopic means; and
   (2) from about 15% to about 80%, by weight of the mixture, of a vinyl acetate-dibutyl maleate copolymer polymer-in-water emulsion.

5. A method for the treatment of soil to reduce soil erosion which comprises applying to the soil surface a soil stabilizing amount of an aqueous composition comprising from about 5% to about 20% by volume of a mixture of
   (1) from about 20% to about 85%, by weight of the mixture, of a thermoplastic petroleum-derived, hydrocarbon resin-in-water emulsion, said resin composed substantially of tetramers and higher polymers of conjugated aliphatic and cyclic dienes and having a softening point of from about 50° to about 100° F., a mixed aniline point of from about 40° to about 80° C., an iodine number of from about 20 to about 300, a saponification number of from about 0 to about 2, a flash point (Cleveland Open Cup) above 350° F., an A.P.I. gravity at 60° F. of from 0 to about 20 degrees, a Gardner color 50% toluene) of from 1 to about 12, and a molecular weight of from 300 to about 600 as measured by cryosopic means; and
   (2) from about 15% to about 80%, by weight of the mixture, of a vinyl acetate-dibutyl maleate copolymer polymer-in-water emulsion.

6. A method for the treatment of soil to reduce soil erosion which comprises applying to the soil surface a soil stabilizing amount of an aqueous composition comprising from about 5% to about 20% by a volume of a mixture of
  (1) from about 20% to about 85%, by weight of the mixture, of a thermoplastic petroleum-derived, substantially completed polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and
  (2) from about 15% to about 80%, by weight of the mixture, of vinyl acetate-dibutyl maleate copolymer polymer-in-water emulsion.

7. An aqueous composition comprising a mixture of
  (1) from about 20% to about 85% by weight of the mixture of a thermoplastic petroleum-derived, hydrocarbon resin-in-water emulsion, said resin having a softening point of from about 50° to about 200° F., a mixed aniline point of from about 20° to about 80° C., and an iodine number of from about 70 to about 300; and
  (2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof.

8. An aqueous composition comprising from about 5% to about 20% by volume of a mixture of
  (1) from about 20% to about 85%, by weight of the mixture, of a thermoplastic petroleum-derived, hydrocarbon resin-in-water emulsion, said resin having a softening point of from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from 300 to about 1400 as measured by cryoscopic means; and
  (2) from about 15% to about 80%, by weight of the mixture of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters of α,β-ethyleneically unsaturated dicarboxylic acids wherein the alkyl ester group contains from 4 to 18 carbon atoms, and mixtures thereof.

9. An aqueous composition comprising from about 5% to about 20% by volume of a mixture of
  (1) from about 20% to about 85%, by weight of the mixture, of a thermoplastic petroleum-derived, hydrocarbon resin-in-water emulsion, said resin having a softening point of from about 50° to about 200° F., a mixed aniline point of from about 20 to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color, (50% toluene) of from 1 to about 12, and a molecular weight of from about 300 to about 1400 as measured by cryoscopic means; and
  (2) from about 15% to about 80%, by weight of the mixture, of a vinyl acetate-dibutyl maleate copolymer polymer-in-water emulsion.

10. An aqueous composition comprising from about 5% to about 20% by volume of a mixture of
  (1) from about 20% to about 85%, by weight of the mixture, of a thermoplastic petroleum-derived, hydrocarbon resin-in-water emulsion, said resin composed substantially of tetramers and higher polymers of conjugated aliphatic and cyclic dienes and having a softening point of from about 50° to about 100° F., a mixed aniline point of from about 40° to about 80° C., an iodine number of from about 200 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from 300 to about 600 as measured by cryoscopic means; and
  (2) from about 15% to about 80%, by weight of the mixture, of a vinyl acetate-dibutyl maleate copolymer polymer-in-water emulsion.

11. An aqueous composition comprising from about 5% to about 20% by volume of a mixture of
  (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20 to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and
  (2) from about 15% to about 80%, by weight of the mixture, of vinyl acetate-dibutyl maleate copolymer polymer-in-water emulsion.

12. A method for the treatment of soil to reduce soil erosion and to control pests which comprises applying to the soil surface a soil stabilizing amount of an aqueous composition comprising a mixture of
  (1) from about 20% to about 85%, by weight of the mixture of a thermoplastic petroleum-derived hydrocarbon resin-in-water emulsion, said resin having a softening point of from about 50° to about 200° F., a mixed aniline point of from about 20° to about 80° C., and an iodine number of from about 70 to about 300;
  (2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof; and
  (3) a pesticidal chemical compound.

13. A method for the treatment of soil to reduce soil erosion and to control pests which comprises applying to the soil surface a soil stabilizing amount of an aqueous composition comprising a mixture of
  (1) from about 20% to about 85%, by weight of the mixture, of a thermoplastic, petroleum-derived, hydrocarbon resin-in-water emulsion, said resin having a softening point of from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity of 60° F. of from 0 to about 20 degrees, a Gardner color (50% toluene) of from 1 to about 12, and a molecular weight of from about 300 to about 1400 as measured by cryoscopic means;

(2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof; and (3) a pesticidally toxic amount of a pesticidal chemical compound selected from the group consisting of herbicides, insecticides, and fungicides.

14. A method for the treatment of soil to reduce soil erosion and to control weeds which comprises applying to the soil surface a soil stabilizing amount of an aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80%, by weight of the mixture, of vinyl acetate-dibutyl maleate copolymer polymer-in-water emulsion;

and (B) of herbicidally toxic amount of a herbicidal chemical compound.

15. A method for the treatment of soil to reduce soil erosion and to control insects which comprises applying to the soil surface a soil stabilizing amount of an aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80%, by weight of the mixture, of vinyl acetate-dibutyl maleate copolymer polymer-in-water emulsion;

and (B) an insecticidally toxic amount of an insecticidal chemical compound.

16. A method for the treatment of soil to reduce soil erosion and to control fungi which comprises applying to the soil surface a soil stabilizing amount of an aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80% by weight of the mixture, of vinyl acetate-dibutyl maleate copolymer polymer-in-water emulsion;

and (B) a fungicidally toxic amount of a fungicidal chemical compound.

17. An aqueous composition comprising a mixture of (1) from about 20% to about 85%, by weight of the mixture of a thermoplastic petroleum-derived hydrocarbon resin-in-water emulsion, said resin having a softening point of from about 50° to about 200° F., a mixed aniline point of from about 20° to about 80° C., and an iodine number of from about 70 to about 300;

(2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof; and (3) a pesticidal chemical compound.

18. An aqueous composition comprising (A) from about 5% to about 20% by volume of a mixture of (1) from about 20% to about 85%, by weight of the mixture, of a thermoplastic petroleum-derived hydrocarbon resin-in-water emulsion, said resin having a softening point of from about 50° to about 200° F., a mixed aniline point of from about 20 to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from about 300 to about 1400 as measured by cryoscopic means; and (2) from about 15% to about 80%, by weight of the mixture, of a vinyl acetate-dibutyl maleate copolymer polymer-in-water emulsion;

and (B) a pesticidally toxic amount of a pesticidal chemical compound selected from the group consisting of herbicides, insecticides, and fungicides.

19. An aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and a softening point of from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity of 60° F. of from 0 to about 20 degrees, a Gardner color (50% toluene) of from 1 to about 12, and a molecular weight of from about 300 to about 1400 as measured by cryoscopic means;

(2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof; and (3) a pesticidally toxic amount of a pesticidal chemical compound selected from the group consisting of herbicides, insecticides, and fungicides.

14. A method for the treatment of soil to reduce soil erosion and to control weeds which comprises applying to the soil surface a soil stabilizing amount of an aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80%, by weight of the mixture, of vinyl acetate-dibutyl maleate copolymer polymer-in-water emulsion;

and (B) of herbicidally toxic amount of a herbicidal chemical compound.

15. A method for the treatment of soil to reduce soil erosion and to control insects which comprises applying to the soil surface a soil stabilizing amount of an aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80%, by weight of the mixture, of vinyl acetate-dibutyl maleate copolymer polymer-in-water emulsion;

and (B) an insecticidally toxic amount of an insecticidal chemical compound.

16. A method for the treatment of soil to reduce soil erosion and to control fungi which comprises applying to the soil surface a soil stabilizing amount of an aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80% by weight of the mixture, of vinyl acetate-dibutyl maleate copolymer polymer-in-water emulsion;

and (B) a fungicidally toxic amount of a fungicidal chemical compound.

17. An aqueous composition comprising a mixture of (1) from about 20% to about 85%, by weight of the mixture of a thermoplastic petroleum-derived hydrocarbon resin-in-water emulsion, said resin having a softening point of from about 50° to about 200° F., a mixed aniline point of from about 20° to about 80° C., and an iodine number of from about 70 to about 300;

(2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof; and (3) a pesticidal chemical compound.

18. An aqueous composition comprising (A) from about 5% to about 20% by volume of a mixture of (1) from about 20% to about 85%, by weight of the mixture, of a thermoplastic petroleum-derived hydrocarbon resin-in-water emulsion, said resin having a softening point of from about 50° to about 200° F., a mixed aniline point of from about 20 to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from about 300 to about 1400 as measured by cryoscopic means; and (2) from about 15% to about 80%, by weight of the mixture, of a vinyl acetate-dibutyl maleate copolymer polymer-in-water emulsion;

and (B) a pesticidally toxic amount of a pesticidal chemical compound selected from the group consisting of herbicides, insecticides, and fungicides.

19. An aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and soil stabilizing amount of an aqueous composition comprising from about 5% to about 20% by a volume of a mixture of
  (1) from about 20% to about 85%, by weight of the mixture, of a thermoplastic petroleum-derived, substantially completed polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and
  (2) from about 15% to about 80%, by weight of the mixture, of vinyl acetate-dibutyl maleate copolymer polymer-in-water emulsion.

7. An aqueous composition comprising a mixture of
  (1) from about 20% to about 85% by weight of the mixture of a thermoplastic petroleum-derived, hydrocarbon resin-in-water emulsion, said resin having a softening point of from about 50° to about 200° F., a mixed aniline point of from about 20° to about 80° C., and an iodine number of from about 70 to about 300; and
  (2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof.

8. An aqueous composition comprising from about 5% to about 20% by volume of a mixture of
  (1) from about 20% to about 85%, by weight of the mixture, of a thermoplastic petroleum-derived, hydrocarbon resin-in-water emulsion, said resin having a softening point of from about 50° to about 200° F., a mixed aniline point of from about 20° to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from 300 to about 1400 as measured by cryoscopic means; and
  (2) from about 15% to about 80%, by weight of the mixture of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethyleneically unsaturated dicarboxylic acids wherein the alkyl ester group contains from 4 to 18 carbon atoms, and mixtures thereof.

9. An aqueous composition comprising from about 5% to about 20% by volume of a mixture of
  (1) from about 20% to about 85%, by weight of the mixture, of a thermoplastic petroleum-derived, hydrocarbon resin-in-water emulsion, said resin having a softening point of from about 50° to about 200° F., a mixed aniline point of from about 20 to about 80° C., an iodine number of from about 70 to about 300, a saponification number of from 0 to about 2, a flash point (Cleveland Open Cup) above 350° F., an A.P.I. gravity at 60° F. of from 0 to about 20 degrees, a Gardner color, (50% toluene) of from 1 to about 12, and a molecular weight of from about 300 to about 1400 as measured by cryoscopic means; and
  (2) from about 15% to about 80%, by weight of the mixture, of a vinyl acetate-dibutyl maleate copolymer polymer-in-water emulsion.

10. An aqueous composition comprising from about 5% to about 20% by volume of a mixture of
  (1) from about 20% to about 85%, by weight of the mixture, of a thermoplastic petroleum-derived, hydrocarbon resin-in-water emulsion, said resin composed substantially of tetramers and higher polymers of conjugated aliphatic and cyclic dienes and having a softening point of from about 50° to about 100° F., a mixed aniline point of from about 40° to about 80° C., an iodine number of from about 200 to about 300, a saponification number of from 0 to about 2, a flash point (Cleveland Open Cup) above 350° F., an A.P.I. gravity at 60° F. of from 0 to about 20 degrees, a Gardner color (50% toluene) of from 1 to about 12, and a molecular weight of from 300 to about 600 as measured by cryoscopic means; and
  (2) from about 15% to about 80%, by weight of the mixture, of a vinyl acetate-dibutyl maleate copolymer polymer-in-water emulsion.

11. An aqueous composition comprising from about 5% to about 20% by volume of a mixture of
  (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20 to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and
  (2) from about 15% to about 80%, by weight of the mixture, of vinyl acetate-dibutyl maleate copolymer polymer-in-water emulsion.

12. A method for the treatment of soil to reduce soil erosion and to control pests which comprises applying to the soil surface a soil stabilizing amount of an aqueous composition comprising a mixture of
  (1) from about 20% to about 85%, by weight of the mixture of a thermoplastic petroleum-derived hydrocarbon resin-in-water emulsion, said resin having a softening point of from about 50° to about 200° F., a mixed aniline point of from about 20° to about 80° C., and an iodine number of from about 70 to about 300;
  (2) from about 15% to about 80%, by weight of the mixture, of a linear polymer-in-water emulsion, said polymer selected from the group consisting of homopolymers of vinyl alcohol, vinyl acetal, vinyl chloride, vinyl acetate, acrylates and methacrylates, copolymers of two or more of said monomers, copolymers of said monomers with vinyl esters of long chain fatty acids, copolymers of said monomers with di(alkyl esters) of α,β-ethylenically unsaturated dicarboxylic acids wherein the alkyl ester group contains from 4 to 18 carbon atoms, and mixtures thereof; and
  (3) a pesticidal chemical compound.

13. A method for the treatment of soil to reduce soil erosion and to control pests which comprises applying to the soil surface a soil stabilizing amount of an aqueous composition comprising a mixture of
  (1) from about 20% to about 85%, by weight of the mixture, of a thermoplastic, petroleum-derived, hydrocarbon resin-in-water emulsion, said resin having (2) from about 15% to about 80%, by weight of the mixture, of vinyl acetate-dibutyl maleate copolymer polymer-in-water emulsion;

and (B) a herbicidally toxic amount of a herbicidal chemical compound.

20. An aqueous composition comprising (A) from about 5% to about 20% of volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P.I. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80%, by weight of the mixture, of vinyl acetate-dibutyl maleate copolymer polymer-in-water emulsion;

and (B) an insecticidally toxic amount of an insecticidal chemical compound.

21. An aqueous composition comprising (A) from about 5% to about 20% by volume of a mixture of (1) from about 20% to about 85%, by weight of the mixture, of a thermoplastic petroleum-derived, substantially completely polymerized, aromatic, hydrocarbon resin-in-water emulsion, said resin having a softening point of from about 100° to about 200° F., a mixed aniline point of from 20° to about 60° C., an iodine number of from about 70 to about 220, a saponification number of from 0 to about 2, a flash point (Cleveland Open Cup) above 425° F., an A.P. gravity at 60° F. of from 0 to about 10 degrees, a Gardner color (50% toluene) of from about 1 to about 12, and a molecular weight of from 600 to about 1400 as measured by cryoscopic means; and (2) from about 15% to about 80%, by weight of the mixture, of vinyl acetate-dibutyl maleate copolymer polymer-in-water emulsion;

and (B) a fungicidally toxic amount of a fungicidal chemical compound.

References Cited by the Examiner

UNITED STATES PATENTS

| | | | |
|---|---|---|---|
| 2,798,867 | 7/1957 | Gordon et al. | 260—80.5 |
| 2,961,799 | 11/1960 | Coe | 47—9 |
| 3,077,054 | 2/1963 | Niemeijer | 260—29.6 |

MURRAY TILLMAN, *Primary Examiner.*

J. L. WHITE, *Assistant Examiner.*